United States Patent
Okawara et al.

(10) Patent No.: US 10,496,540 B2
(45) Date of Patent: Dec. 3, 2019

(54) PROCESSOR AND CONTROL METHOD OF PROCESSOR

(71) Applicant: FUJITSU LIMITED, Kawasaki-shi, Kanagawa (JP)

(72) Inventors: Hideki Okawara, Kawasaki (JP);
Noriko Takagi, Kawasaki (JP);
Yasunobu Akizuki, Kawasaki (JP);
Kenichi Kitamura, Kawasaki (JP);
Mikio Hondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 40 days.

(21) Appl. No.: 15/220,425

(22) Filed: Jul. 27, 2016

(65) Prior Publication Data
US 2017/0060748 A1 Mar. 2, 2017

(30) Foreign Application Priority Data
Aug. 24, 2015 (JP) .................. 2015-165252

(51) Int. Cl.
*G06F 12/08* (2016.01)
*G06F 12/0846* (2016.01)
(Continued)

(52) U.S. Cl.
CPC ...... *G06F 12/0848* (2013.01); *G06F 9/30036* (2013.01); *G06F 9/30043* (2013.01);
(Continued)

(58) Field of Classification Search
CPC ............ G06F 9/30036; G06F 9/3885; G06F 12/0844; G06F 12/0855; G06F 9/30043
See application file for complete search history.

(56) References Cited

U.S. PATENT DOCUMENTS 5,390,307 A * 2/1995 Yoshida .............. G06F 9/30043
712/225
8,266,367 B2 * 9/2012 Yu ........................ G06F 3/0608
711/103
(Continued)

FOREIGN PATENT DOCUMENTS

JP 2011-134318 A 7/2011

OTHER PUBLICATIONS

Christopher Batten, Cache Refill/Access Decoupling for Vector Machines, 2004, IEEE,, 37th International Symposium on Microarchitecture , pp. 331-342 (Year: 2004).*
(Continued)

*Primary Examiner* — Khoa D Doan
(74) *Attorney, Agent, or Firm* — Fujitsu Patent Center

(57) ABSTRACT

A processor includes a cache memory, an issuing unit that issues, with respect to all element data as a processing object of a load instruction, a cache request to the cache memory for each of a plurality of groups which are divided to include element data, a comparing unit that compares addresses of the element data as the processing object of the load instruction, and determines whether element data in a same group are simultaneously accessible, and a control unit that accesses the cache memory according to the cache request registered in a load queue registering one or more cache requests issued from the issuing unit. The control unit processes by one access whole element data determined to be simultaneously accessible by the comparing unit.

7 Claims, 18 Drawing Sheets

(51) Int. Cl.
*G06F 12/0895* (2016.01)
*G06F 9/48* (2006.01)
*G06F 9/30* (2018.01)
*G06F 9/345* (2018.01)
*G06F 9/38* (2018.01)

(52) U.S. Cl.
CPC ............ *G06F 9/345* (2013.01); *G06F 9/3824* (2013.01); *G06F 9/48* (2013.01); *G06F 12/0895* (2013.01); *G06F 2212/1024* (2013.01); *G06F 2212/281* (2013.01); *G06F 2212/282* (2013.01); *G06F 2212/608* (2013.01)

(56) References Cited

U.S. PATENT DOCUMENTS

| | | | | |
|---|---|---|---|---|
| 9,632,777 B2* | 4/2017 | Fleischer | ............ | G06F 9/30043 |
| 9,928,170 B2* | 3/2018 | Koker | ................ | G06F 12/0804 |
| 2003/0105929 A1* | 6/2003 | Ebner | ................ | G06F 12/084 |
| | | | | 711/144 |
| 2003/0200408 A1* | 10/2003 | Mekhiel | ............. | G06F 12/0215 |
| | | | | 711/167 |
| 2005/0273576 A1* | 12/2005 | Wilson | ................ | G06F 9/30036 |
| | | | | 711/217 |
| 2006/0112235 A1* | 5/2006 | Cabot | ................ | G06F 12/0879 |
| | | | | 711/141 |
| 2009/0172364 A1* | 7/2009 | Sprangle | ............. | G06F 9/30043 |
| | | | | 712/225 |
| 2011/0153983 A1* | 6/2011 | Hughes | ............... | G06F 9/30018 |
| | | | | 712/22 |
| 2012/0060015 A1* | 3/2012 | Eichenberger | ...... | G06F 15/8069 |
| | | | | 712/4 |
| 2012/0144089 A1* | 6/2012 | Hall | ........................ | G06F 12/08 |
| | | | | 711/3 |
| 2012/0159130 A1* | 6/2012 | Smelyanskiy | .......... | G06F 9/345 |
| | | | | 712/216 |
| 2012/0254542 A1 | 10/2012 | Raikin et al. | | |
| 2012/0254591 A1* | 10/2012 | Hughes | ............... | G06F 9/30018 |
| | | | | 712/205 |
| 2013/0326160 A1* | 12/2013 | Sperber | ............... | G06F 9/30036 |
| | | | | 711/154 |
| 2013/0332705 A1* | 12/2013 | Martinez | ............. | G06F 9/30003 |
| | | | | 712/220 |
| 2014/0344553 A1* | 11/2014 | Hughes | ................. | G06F 9/3861 |
| | | | | 712/208 |
| 2015/0074354 A1 | 3/2015 | Sprangle et al. | | |
| 2015/0074373 A1 | 3/2015 | Sperber et al. | | |
| 2018/0129506 A1 | 5/2018 | Hughes et al. | | |

OTHER PUBLICATIONS

Johannes Hofmann et al., "Comparing the Performance of Different x86 SIMD Instruction Sets for a Medical Imaging Application on Modern Multi- and Manycore Chips", Jan. 29, 2014 (8 pages).

Japanese Office Action dated Dec. 11, 2018 for corresponding Japanese Patent Application No. 2015-165252, with English Translation, 7 pages.

\* cited by examiner

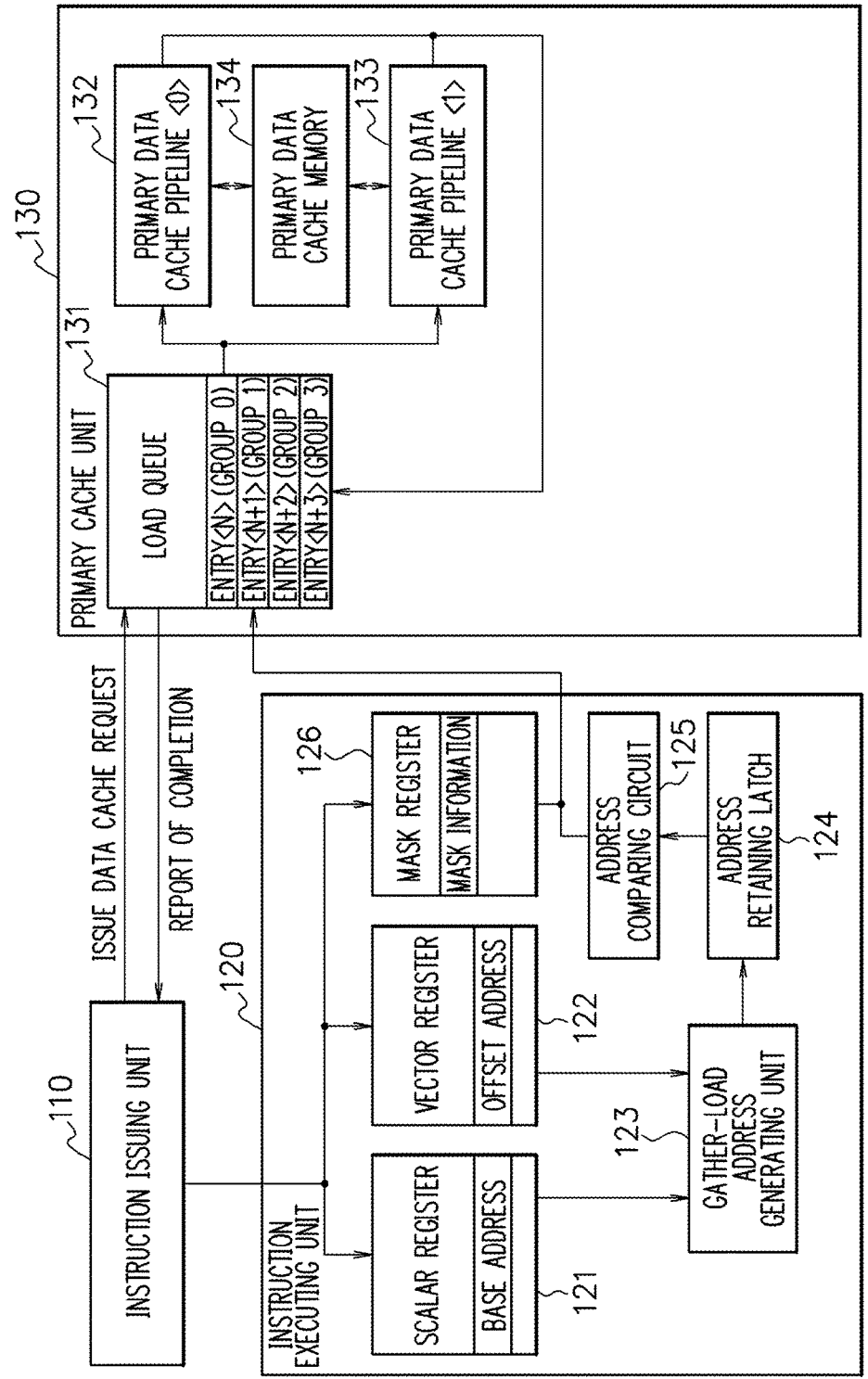
F I G. 1

FIG. 2

| LOAD QUEUE | | | | | | | |
|---|---|---|---|---|---|---|---|
| STATE FLAG | DATA SIZE | GROUP NUMBER (GROUP 0) | ADDRESS COMPARISON RESULT | PROCESSING COMPLETION FLAG | MASK FLAG | HEAD ELEMENT ADDRESS [63:0] | SUBSEQUENT ELEMENT ADDRESS [63:0] |
| STATE FLAG | DATA SIZE | GROUP NUMBER (GROUP 1) | ADDRESS COMPARISON RESULT | PROCESSING COMPLETION FLAG | MASK FLAG | HEAD ELEMENT ADDRESS [63:0] | SUBSEQUENT ELEMENT ADDRESS [63:0] |
| STATE FLAG | DATA SIZE | GROUP NUMBER (GROUP 2) | ADDRESS COMPARISON RESULT | PROCESSING COMPLETION FLAG | MASK FLAG | HEAD ELEMENT ADDRESS [63:0] | SUBSEQUENT ELEMENT ADDRESS [63:0] |
| STATE FLAG | DATA SIZE | GROUP NUMBER (GROUP 3) | ADDRESS COMPARISON RESULT | PROCESSING COMPLETION FLAG | MASK FLAG | HEAD ELEMENT ADDRESS [63:0] | SUBSEQUENT ELEMENT ADDRESS [63:0] |
| 201 | 202 | 203 | 204 | 205 | 206 | 207 | 208 |

ENTRY<N> (GROUP 0)
ENTRY<N+1> (GROUP 1)
ENTRY<N+2> (GROUP 2)
ENTRY<N+3> (GROUP 3)

131

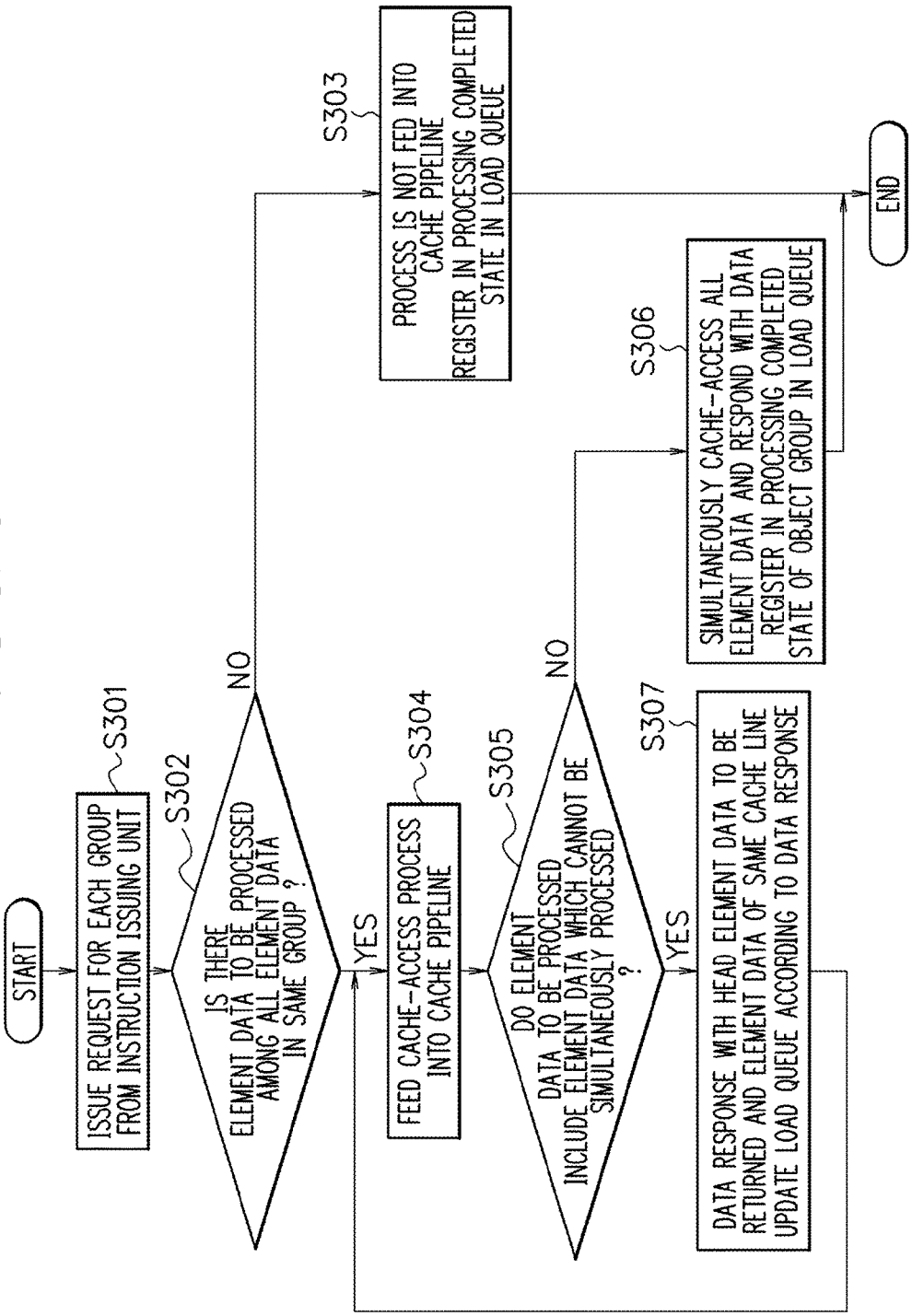

FIG. 5

| LOAD QUEUE | | | | | | | | |
|---|---|---|---|---|---|---|---|---|
| ENTRY⟨N⟩ (GROUP 0) | STATE FLAG | DATA SIZE | GROUP NUMBER (GROUP 0) | ADDRESS COMPARISON RESULT | PROCESSING COMPLETION FLAG | MASK FLAG | PROCESSING ELEMENT ADDRESS [63:0] | SUBSEQUENT ELEMENT ADDRESS [6:0] | STORE QUEUE NUMBER |
| ENTRY⟨N+1⟩ (GROUP 1) | STATE FLAG | DATA SIZE | GROUP NUMBER (GROUP 1) | ADDRESS COMPARISON RESULT | PROCESSING COMPLETION FLAG | MASK FLAG | PROCESSING ELEMENT ADDRESS [63:0] | SUBSEQUENT ELEMENT ADDRESS [6:0] | STORE QUEUE NUMBER |
| ENTRY⟨N+2⟩ (GROUP 2) | STATE FLAG | DATA SIZE | GROUP NUMBER (GROUP 2) | ADDRESS COMPARISON RESULT | PROCESSING COMPLETION FLAG | MASK FLAG | PROCESSING ELEMENT ADDRESS [63:0] | SUBSEQUENT ELEMENT ADDRESS [6:0] | STORE QUEUE NUMBER |
| ENTRY⟨N+3⟩ (GROUP 3) | STATE FLAG | DATA SIZE | GROUP NUMBER (GROUP 3) | ADDRESS COMPARISON RESULT | PROCESSING COMPLETION FLAG | MASK FLAG | PROCESSING ELEMENT ADDRESS [63:0] | SUBSEQUENT ELEMENT ADDRESS [6:0] | STORE QUEUE NUMBER |
| | 201 | 202 | 203 | 204 | 205 | 206 | 501 | 502 | 503 |

131

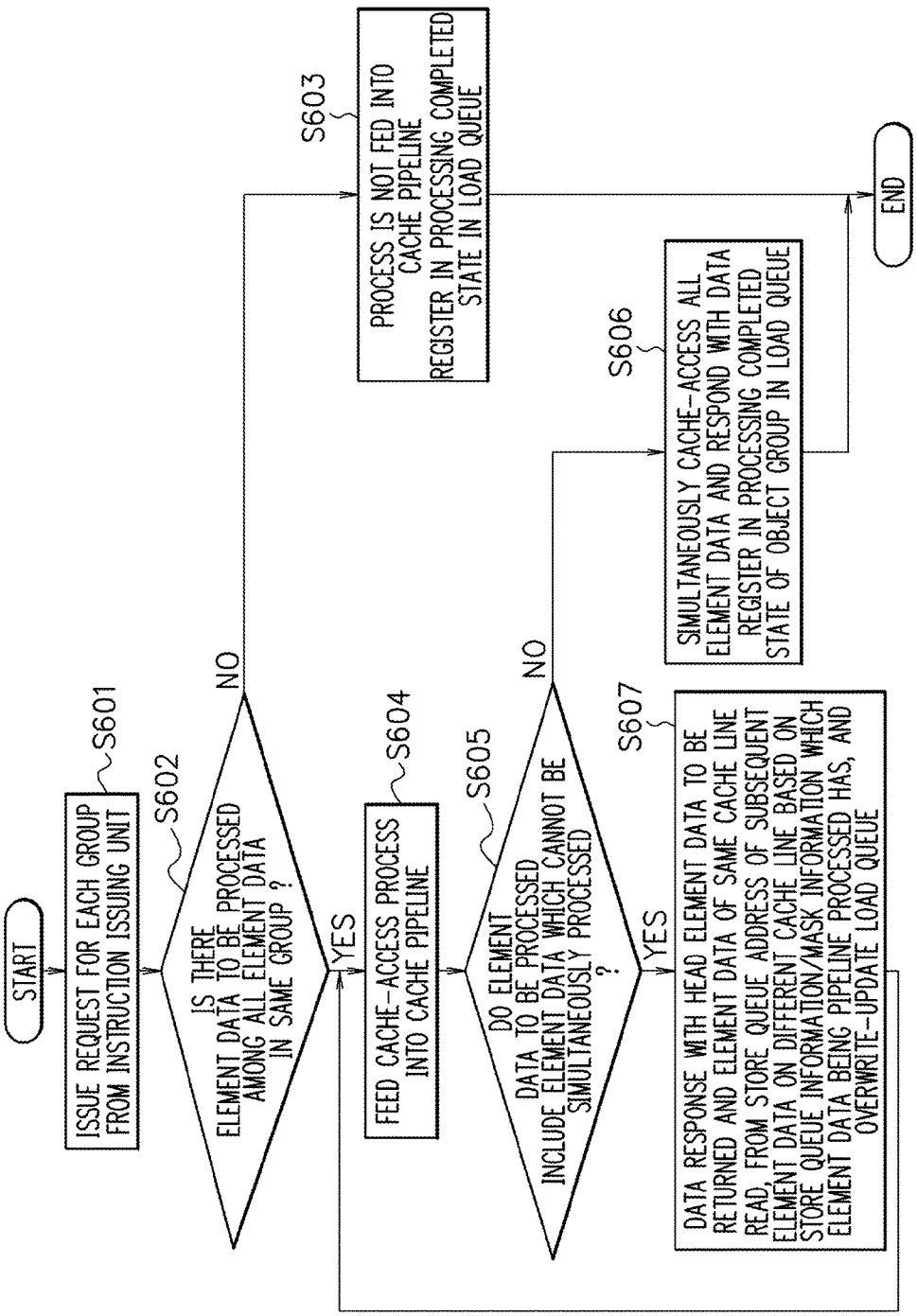

FIG. 7

| CYCLE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| INSTRUCTION ISSUING UNIT PIPELINE (8B×8SIMD) | IF1 | IF2 | ID1 | ID2 | DS1 | DS2 | OP1 | AG1 | AG2 | | | | | | | |
| INSTRUCTION EXECUTING UNIT ADDRESS CALCULATION | | | | | | | | | | | | | | | | |
| GROUP 0=DATA 00&01 (PIPELINE<0>) | | | | | | | | | DR0 | DC1 | DC2 | | | | | |
| GROUP 1=DATA 02&03 (PIPELINE<1>) | | | | | | | | | DR0 | DC1 | DC2 | | | | | |
| GROUP 2=DATA 04&05 (PIPELINE<0>) | | | | | | | | | | DR0 | DC1 | DC2 | | | | |
| GROUP 3=DATA 06&07 (PIPELINE<1>) | | | | | | | | | | DR0 | DC1 | DC2 | | | | |
| INSTRUCTION ISSUING UNIT PIPELINE (4B×16SIMD) | | | IF1 | IF2 | ID1 | ID2 | DS1 | DS2 | OP1 | AG1 | AG2 | | | | | |
| INSTRUCTION EXECUTING UNIT ADDRESS CALCULATION | | | | | | | | | | | | | | | | |
| GROUP 0=DATA 00&01 (PIPELINE<0>) | | | | | | | | | | | DR0 | DC1 | DC2 | | | |
| GROUP 1=DATA 02&03 (PIPELINE<1>) | | | | | | | | | | | DR0 | DC1 | DC2 | | | |
| GROUP 2=DATA 04&05 (PIPELINE<0>) | | | | | | | | | | | | DR0 | DC1 | DC2 | | |
| GROUP 3=DATA 06&07 (PIPELINE<1>) | | | | | | | | | | | | DR0 | DC1 | DC2 | | |
| GROUP 4=DATA 08&09 (PIPELINE<0>) | | | | | | | | | | | | | DR0 | DC1 | DC2 | |
| GROUP 5=DATA 10&11 (PIPELINE<1>) | | | | | | | | | | | | | DR0 | DC1 | DC2 | |
| GROUP 6=DATA 12&13 (PIPELINE<0>) | | | | | | | | | | | | | | DR0 | DC1 | DC2 |
| GROUP 7=DATA 14&15 (PIPELINE<1>) | | | | | | | | | | | | | | DR0 | DC1 | DC2 |

FIG. 8A

| CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| INSTRUCTION ISSUING UNIT PIPELINE (8B×8SIMD) | IF1 | IF2 | ID1 | ID2 | DS1 | DS2 | | | | | | | | | | | | | | | | |
| INSTRUCTION EXECUTING UNIT ADDRESS CALCULATION | | | | | | | OP1 | AG1 | AG2 | | | | | | | | | | | | | |
| DATA 00 (PIPELINE <0>) | | | | | | | | | | DR0 | DC1 | DC2 | | | | | | | | | | |
| DATA 01 (PIPELINE <1>) | | | | | | | | | | DR0 | DC1 | DC2 | | | | | | | | | | |
| DATA 02 (PIPELINE <0>) | | | | | | | | | | | DR0 | DC1 | DC2 | | | | | | | | | |
| DATA 03 (PIPELINE <1>) | | | | | | | | | | | DR0 | DC1 | DC2 | | | | | | | | | |
| DATA 04 (PIPELINE <0>) | | | | | | | | | | | | DR0 | DC1 | DC2 | | | | | | | | |
| DATA 05 (PIPELINE <1>) | | | | | | | | | | | | DR0 | DC1 | DC2 | | | | | | | | |
| DATA 06 (PIPELINE <0>) | | | | | | | | | | | | | DR0 | DC1 | DC2 | | | | | | | |
| DATA 07 (PIPELINE <1>) | | | | | | | | | | | | | DR0 | DC1 | DC2 | | | | | | | |

F I G. 8B

| CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| INSTRUCTION ISSUING UNIT PIPELINE (48x16SIMD) | | | | | IF1 | IF2 | ID1 | ID2 | DS1 | DS2 | | | | | | | | | | | | |
| INSTRUCTION EXECUTING UNIT ADDRESS CALCULATION | | | | | | | | | | | OP1 | AG1 | AG2 | | | | | | | | | |
| DATA 00 (PIPELINE <0>) | | | | | | | | | | | | | | DR0 | DC1 | DC2 | | | | | | |
| DATA 01 (PIPELINE <1>) | | | | | | | | | | | | | | DR0 | DC1 | DC2 | | | | | | |
| DATA 02 (PIPELINE <0>) | | | | | | | | | | | | | | | DR0 | DC1 | DC2 | | | | | |
| DATA 03 (PIPELINE <1>) | | | | | | | | | | | | | | | DR0 | DC1 | DC2 | | | | | |
| DATA 04 (PIPELINE <0>) | | | | | | | | | | | | | | | | DR0 | DC1 | DC2 | | | | |
| DATA 05 (PIPELINE <1>) | | | | | | | | | | | | | | | | DR0 | DC1 | DC2 | | | | |
| DATA 06 (PIPELINE <0>) | | | | | | | | | | | | | | | | | DR0 | DC1 | DC2 | | | |
| DATA 07 (PIPELINE <1>) | | | | | | | | | | | | | | | | | DR0 | DC1 | DC2 | | | |
| DATA 08 (PIPELINE <0>) | | | | | | | | | | | | | | | | | | DR0 | DC1 | DC2 | | |
| DATA 09 (PIPELINE <1>) | | | | | | | | | | | | | | | | | | DR0 | DC1 | DC2 | | |
| DATA 10 (PIPELINE <0>) | | | | | | | | | | | | | | | | | | | DR0 | DC1 | DC2 | |
| DATA 11 (PIPELINE <1>) | | | | | | | | | | | | | | | | | | | DR0 | DC1 | DC2 | |
| DATA 12 (PIPELINE <0>) | | | | | | | | | | | | | | | | | | | | DR0 | DC1 | DC2 |
| DATA 13 (PIPELINE <1>) | | | | | | | | | | | | | | | | | | | | DR0 | DC1 | DC2 |
| DATA 14 (PIPELINE <0>) | | | | | | | | | | | | | | | | | | | | | DR0 | DC1 | DC2 |
| DATA 15 (PIPELINE <1>) | | | | | | | | | | | | | | | | | | | | | DR0 | DC1 | DC2 |

F I G. 9

| CYCLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| INSTRUCTION ISSUING UNIT PIPELINE (8B×8SIMD) | IF1 | IF2 | ID1 | ID2 | DS1 | DS2 | OP1 | AG1 | AG2 | | | | | |
| INSTRUCTION EXECUTING UNIT ADDRESS CALCULATION | | | | | | | | | | | | | | |
| GROUP 0=DATA 00&01 (PIPELINE<0>) | | | | | | | | | | DC1 | DC2 | | | |
| GROUP 1=DATA 02&03 (PIPELINE<1>) | | | | | | | | | DR0 | DR0 | | | | |
| GROUP 2=DATA 04&05 (PIPELINE<0>) | | | | | | | | | DR0 | | | | | |
| GROUP 3=DATA 06&07 (PIPELINE<1>) | | | | | | | | | | DR0 | | | | |
| INSTRUCTION ISSUING UNIT PIPELINE (4B×16SIMD) | | | IF1 | IF2 | ID1 | ID2 | DS1 | DS2 | | | | | | |
| INSTRUCTION EXECUTING UNIT ADDRESS CALCULATION | | | | | | | | | OP1 | AG1 | AG2 | | | |
| GROUP 0=DATA 00&01 (PIPELINE<0>) | | | | | | | | | | | DR0 | DC1 | DC2 | |
| GROUP 1=DATA 02&03 (PIPELINE<1>) | | | | | | | | | | | DR0 | DR0 | | |
| GROUP 2=DATA 04&05 (PIPELINE<0>) | | | | | | | | | | | | DR0 | | |
| GROUP 3=DATA 06&07 (PIPELINE<1>) | | | | | | | | | | | | DR0 | | |
| GROUP 4=DATA 08&09 (PIPELINE<0>) | | | | | | | | | | | | | DR0 | |
| GROUP 5=DATA 10&11 (PIPELINE<1>) | | | | | | | | | | | | | DR0 | |
| GROUP 6=DATA 12&13 (PIPELINE<0>) | | | | | | | | | | | | | | DR0 |
| GROUP 7=DATA 14&15 (PIPELINE<1>) | | | | | | | | | | | | | | DR0 |

FIG. 10

| CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| INSTRUCTION ISSUING UNIT PIPELINE (8Bx8SIMD) | IF1 | IF2 | ID1 | ID2 | DS1 | DS2 | | | | | | | | | | | | | | | | |
| INSTRUCTION EXECUTING UNIT ADDRESS CALCULATION | | | | | | | OP1 | AG1 | AG2 | | | | | | | | | | | | | |
| FORWARD SUBSEQUENT ELEMENT ADDRESS TO STORE QUEUE (ENTRY 1) | | | | | | | | | SET | | | | | | | | | | | | | |
| ADDRESS VALID PERIOD OF STORE QUEUE (ENTRY 1) | | | | | | | | | | | | | | | | | | | | | | |
| GROUP 0=DATA 00&01 (PIPELINE<0>) | | | | | | | | | | DR0 | DC1 | DC2 | | | | | | | | | | |
| GROUP 1=DATA 02&03 (PIPELINE<1>) | | | | | | | | | | DR0 | DC1 | DC2 | | | | | | | | | | |
| GROUP 2=DATA 04&05 (PIPELINE<0>) | | | | | | | | | | | DR0 | DC1 | DC2 | | | | | | | | | |
| GROUP 3=DATA 06&07 (PIPELINE<1>) | | | | | | | | | | | DR0 | DC1 | DC2 | | | | | | | | | |
| INSTRUCTION ISSUING UNIT PIPELINE (4Bx16SIMD) | | | IF1 | IF2 | ID1 | ID2 | DS1 | DS2 | | | | | | | | | | | | | | |
| INSTRUCTION EXECUTING UNIT ADDRESS CALCULATION | | | | | | | | | OP1 | AG1 | AG2 | | | | | | | | | | | |
| FORWARD SUBSEQUENT ELEMENT ADDRESS TO STORE QUEUE (ENTRY 2) | | | | | | | | | | | SET | | | | | | | | | | | |
| ADDRESS VALID PERIOD OF STORE QUEUE (ENTRY 2) | | | | | | | | | | | | | | | | | | | | | | |
| GROUP 0=DATA 00&01 (PIPELINE<0>) | | | | | | | | | | | | DR0 | DC1 | DC2 | | | | | | | | |
| GROUP 1=DATA 02&03 (PIPELINE<1>) | | | | | | | | | | | | DR0 | DC1 | DC2 | | | | | | | | |
| GROUP 2=DATA 04&05 (PIPELINE<0>) | | | | | | | | | | | | | DR0 | DC1 | DC2 | | | | | | | |
| GROUP 3=DATA 06&07 (PIPELINE<1>) | | | | | | | | | | | | | DR0 | DC1 | DC2 | | | | | | | |
| GROUP 4=DATA 08&09 (PIPELINE<0>) | | | | | | | | | | | | | | | | DC1 | DC2 | | | | | |
| GROUP 5=DATA 10&11 (PIPELINE<1>) | | | | | | | | | | | | | | | | DC1 | DC2 | | | | | |
| GROUP 6=DATA 12&13 (PIPELINE<0>) | | | | | | | | | | | | | | DR0 | | | | DC1 | DC2 | | | |
| GROUP 7=DATA 14&15 (PIPELINE<1>) | | | | | | | | | | | | | | DR0 | | | | DC1 | DC2 | | | |

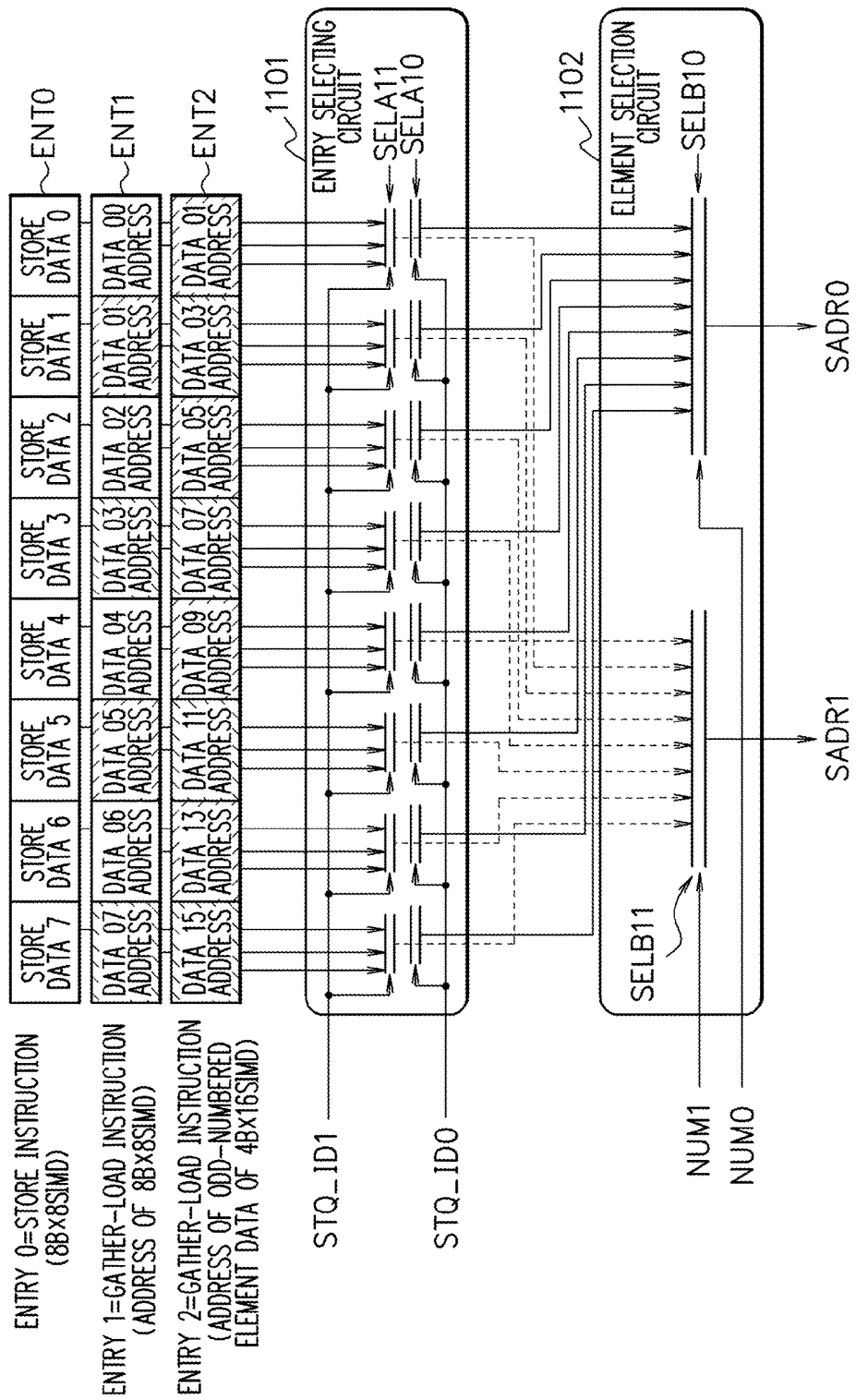

F I G. 13

| CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| INSTRUCTION ISSUING UNIT PIPELINE (8Bx8SIMD) | IF1 | IF2 | ID1 | ID2 | DS1 | DS2 | | | | | | | | | | | | | | | | |
| INSTRUCTION EXECUTING UNIT ADDRESS CALCULATION | | | | | | | OP1 | AG1 | AG2 | | | | | | | | | | | | | |
| FORWARD SUBSEQUENT ELEMENT ADDRESS TO STORE QUEUE (ENTRY 1) | | | | | | | | | SET | | | | | | | | | | | | | |
| GROUP 0=DATA 00&01 (PIPELINE<0>) | | | | | | | | | DR0 | DC1 | DC2 | | | | | | | | | | | |
| GROUP 1=DATA 02&03 (PIPELINE<1>) | | | | | | | | | DR0 | DC1 | DC2 | | | | | | | | | | | |
| GROUP 2=DATA 04&05 (PIPELINE<0>) | | | | | | | | | | DR0 | DC1 | DC2 | | | | | | | | | | |
| GROUP 3=DATA 06&07 (PIPELINE<1>) | | | | | | | | | | DR0 | DC1 | DC2 | | | | | | | | | | |
| INSTRUCTION ISSUING UNIT PIPELINE (4Bx16SIMD) | | | IF1 | IF2 | ID1 | ID2 | DS1 | DS2 | | | | | | | | | | | | | | |
| INSTRUCTION EXECUTING UNIT ADDRESS CALCULATION | | | | | | | | | OP1 | AG1 | AG2 | | | | | | | | | | | |
| FORWARD SUBSEQUENT ELEMENT ADDRESS TO STORE QUEUE (ENTRY 2) | | | | | | | | | | | SET | | | | | | | | | | | |
| GROUP 0=DATA 00&01 (PIPELINE<1>) | | | | | | | | | | | DR0 | DC1 | DC2 | | | | | | | | | |
| GROUP 1=DATA 02&03 (PIPELINE<0>) | | | | | | | | | | | DR0 | DC1 | DC2 | | | | | | | | | |
| GROUP 2=DATA 04&05 (PIPELINE<1>) | | | | | | | | | | | | DR0 | DC1 | DC2 | | | | | | | | |
| GROUP 3=DATA 06&07 (PIPELINE<0>) | | | | | | | | | | | | DR0 | DC1 | DC2 | | | | | | | | |
| GROUP 4=DATA 08&09 (PIPELINE<1>) | | | | | | | | | | | | | DR0 | DC1 | DC2 | | | | | | | |
| GROUP 5=DATA 10&11 (PIPELINE<0>) | | | | | | | | | | | | | DR0 | DC1 | DC2 | | | | | | | |
| GROUP 6=DATA 12&13 (PIPELINE<1>) | | | | | | | | | | | | | | DR0 | DC1 | DC2 | | | | | | |
| GROUP 7=DATA 14&15 (PIPELINE<0>) | | | | | | | | | | | | | | DR0 | DC1 | DC2 | | | | | | |

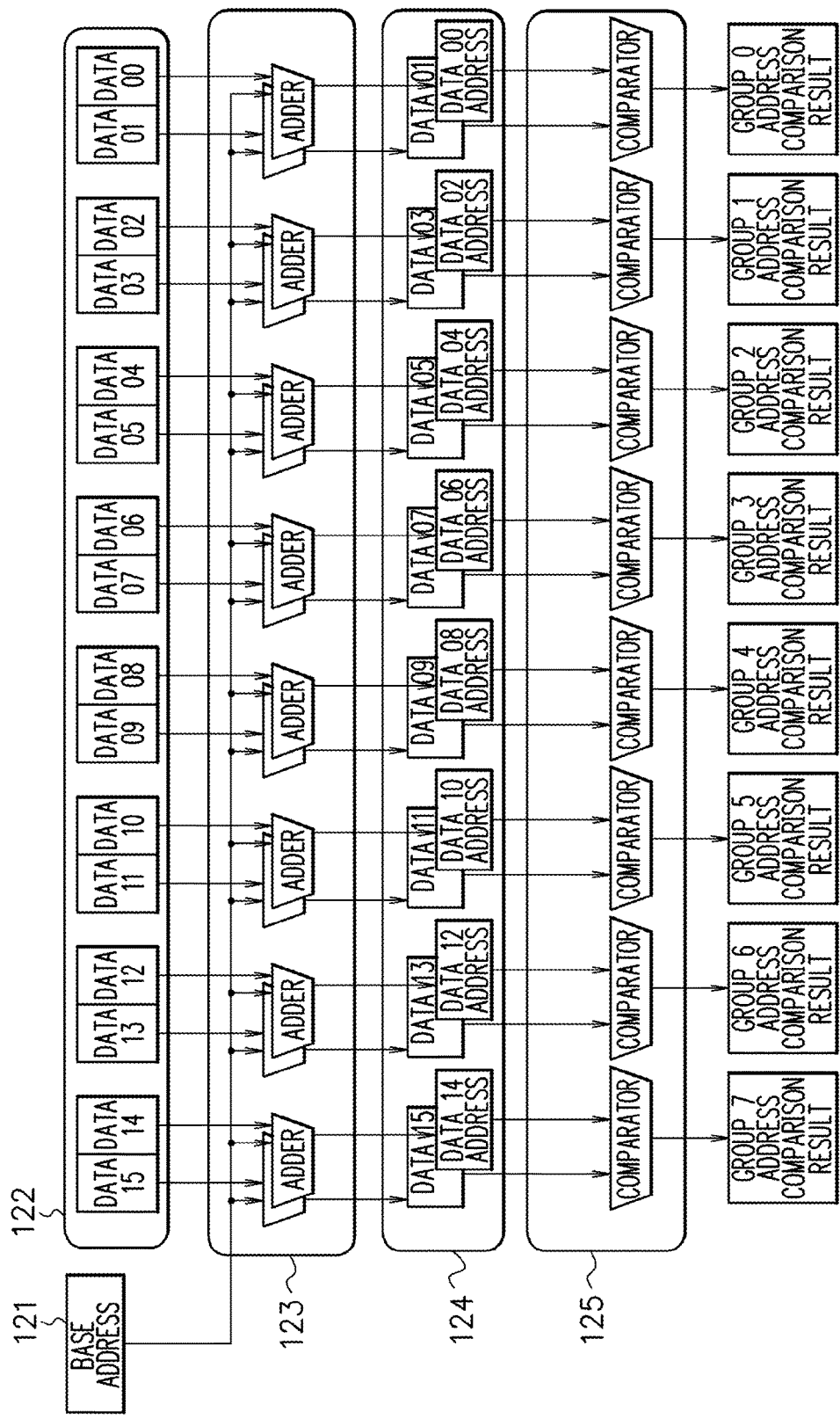
F I G. 15

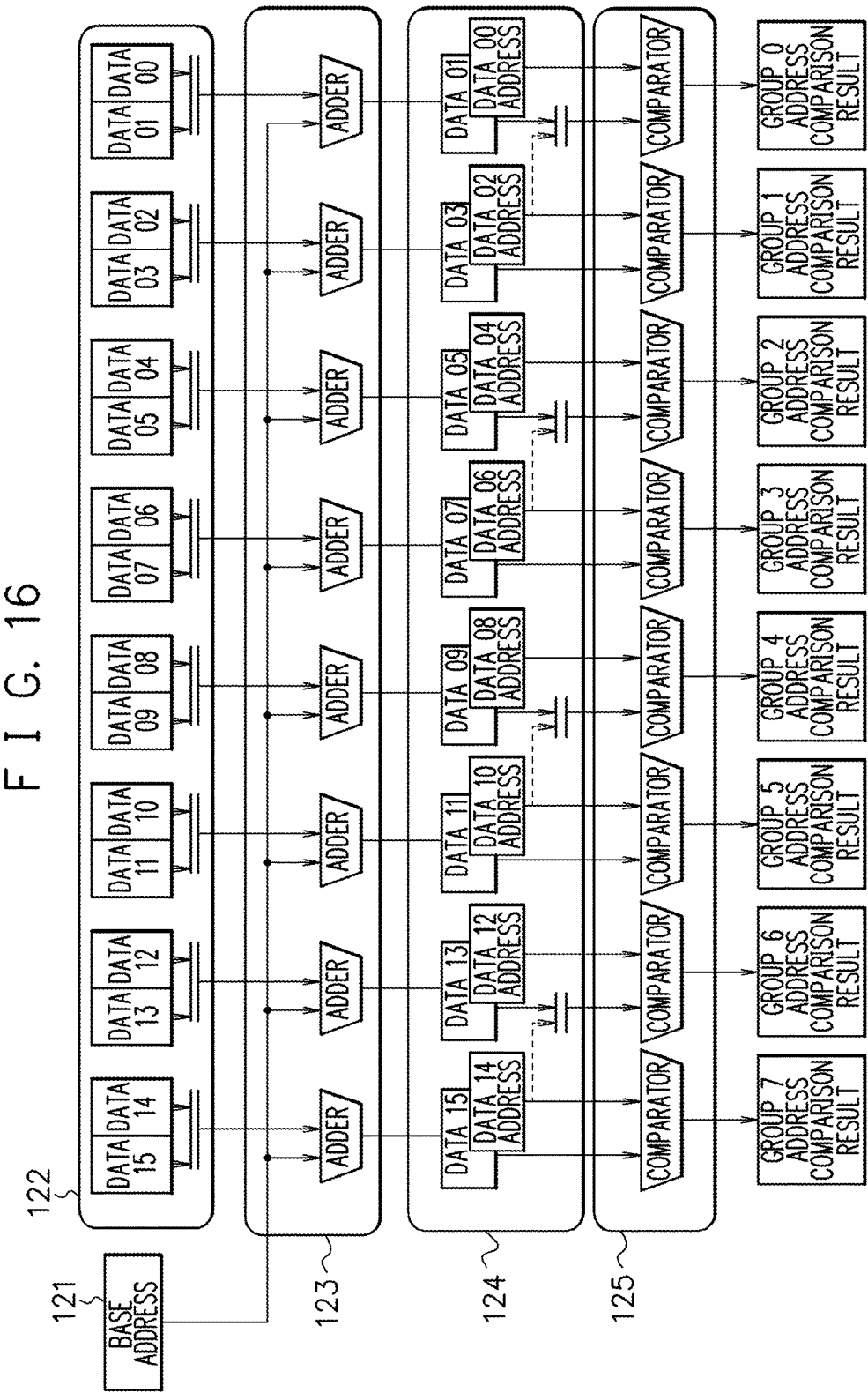

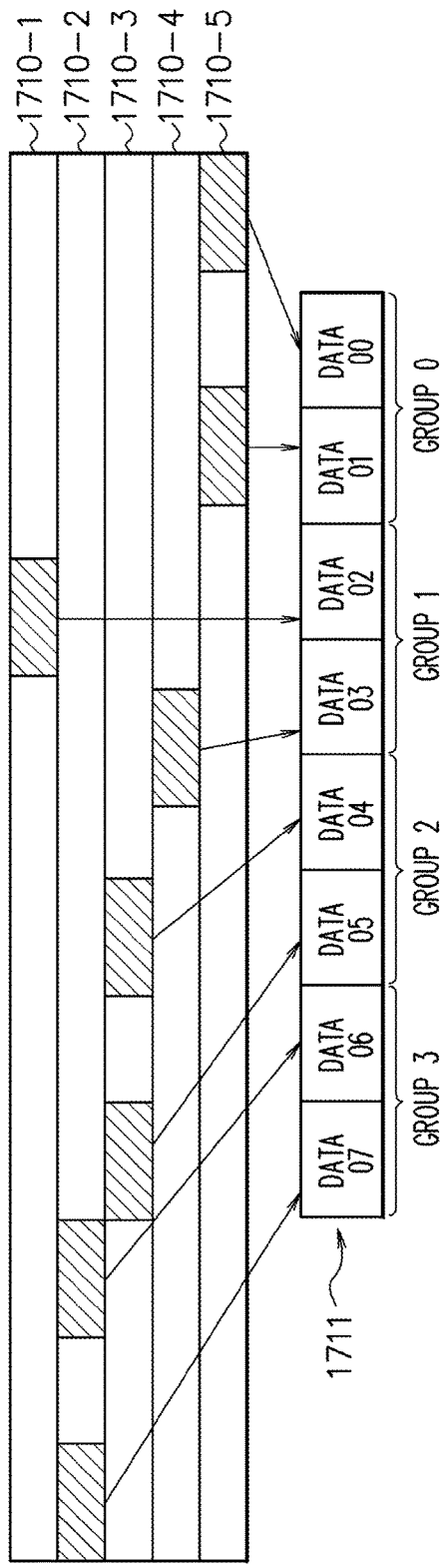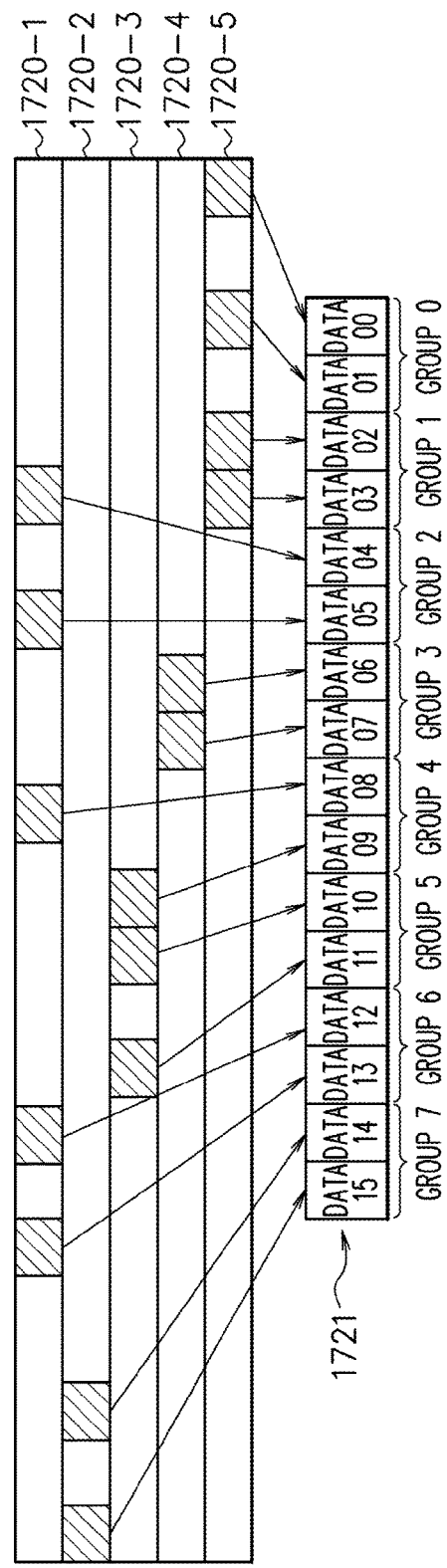

PROCESSOR AND CONTROL METHOD OF PROCESSOR

CROSS-REFERENCE TO RELATED APPLICATION

This application is based upon and claims the benefit of priority of the prior Japanese Patent Application No. 2015-165252, filed on Aug. 24, 2015, the entire contents of which are incorporated herein by reference.

FIELD

The embodiments discussed herein are directed to a processor and a control method of a processor.

BACKGROUND

It is tried to improve performance of an application by vectorization and adoption of SIMD (Single Instruction, Multiple Data) with respect to arithmetic functions of a processor. By simultaneously executing operations of a plurality of element data which are load objects by one instruction, the operation throughput of the processor increases, and the performance of the processor improves. To make a SIMD application, transfer of data also adapts to SIMD between a main memory and a register. Here, "element data" refers to individual data to be the load object.

It is easy to adapt transfer of data to SIMD between the memory and the register with respect to data stored in continuous areas in the memory. The memory access by an application is possibly not an access to continuous areas. For example, among science and technology calculations, there are many applications handling a sparse matrix operation or a data structure, and there are demands for adoption of SIMD to accelerate a memory access for data stored in non-continuous areas in the memory.

Hitherto, the transfer of data between the memory and the register with respect to data stored in non-continuous areas in the memory is programmed by using a plurality of instructions, such as a shift instruction, a data insertion instruction, and a data movement instruction in the register, and thus there are problems that the programming becomes complicated and that the performance is not high. Accordingly, processors having a gather-load instruction are appearing, which is an instruction to gather and load a plurality of data stored in non-continuous areas in the memory into one register.

The gather-load instruction is highly flexible and facilitates programming, but is difficult to process at high speed by hardware, and sufficient performance is not achieved in practice. The data size and the data range which a cache access and a memory access can have are restricted by a physical hardware configuration. For example, in general, data in different cache lines cannot be accessed simultaneously.

The gather-load instruction possibly accesses completely different addresses for all the element data which are a plurality of load objects. Thus, assuming a worst case, a mounting method for the gather-load instruction to disassemble into processes per element data and load respective element data in parallel is conceivable. However, when processes are performed per element data, the throughput performance effect of SIMD adoption is not obtained through the process of the gather-load instruction.

When it is tried to increase the throughput performance of the gather-load instruction, in a case where a plurality of element data are simultaneously accessible, it is conceivable that simultaneous loading of them can decrease the number of times of cache access. Specifically, it is conceivable to proceed with processing in order from simultaneously loadable element data in combination with mask information indicating whether it is necessary to load every element data which is a load object.

In this method, first, a request to the head element data which needs to be loaded (whose mask information is 1) is issued to perform a load process. At this time, the head element data which needs to be loaded and the subsequent element data on the same cache line are simultaneously processed, and the mask information of each element data which finished being processed is set to 0 (zero) to update it to a processed state. Next, the process is re-executed on the element data for which mask information is 1 (the load process needs to be executed) in the first place when it is seen from the head side, so as to perform the subsequent load process.

The above process is re-executed plural times repeatedly as long as element data which need to be loaded (for which mask information is 1) exist, and when no element data which need to be loaded (mask information is all 0) exist, the entire gather-load instruction itself is completed. In this method, the mask information and the element data to be processed next are determined by the result of the previous process. This is hence a serial process, the latency of the entirety becomes long, and there is a problem of low performance.

As an example of mounting this method as hardware, a method is described in Patent Document 1, for which hardware resources for retaining addresses, masks, and offsets of all element data are provided in a gather control unit, resulting in a large increase in physical quantity of the circuit. It is also conceivable to mount this method as software so as to re-execute a plurality of times of gather-load instruction in a program level. However, when the address range of the load object are located across plural cache lines, the gather-load instruction is sequentially processed again and again, resulting in quite large latency.

Further, a method as follows is proposed in a processor in which update of mask information accompanying the completion of processing the previous element data and address generation related to the next element data are internally divided into plural serial processes in the level of an instruction issuing unit and instruction operating unit in the hardware (see Patent Document 2). An index table having address offsets converted from plural processing vector registers and having mask information is provided near an address generator, and the update of mask information accompanying the completion of processing the previous element data and the address generation for the next element data are processed simultaneously. Thus, the number of plural serial processes internally divided in the hardware is decreased, to thereby improve the performance. Further, when element data whose address offsets are exactly the same exist, data read as head element data is broadcasted to all the element data of the vector register in advance, and a plurality of actual write signals are simultaneously asserted and simultaneously processed, to thereby achieve high speed.

[Patent Document 1] U.S. Patent Application Publication No. 2012/0254542

[Patent Document 2] U.S. Patent Application Publication No. 2015/0074373

SUMMARY

An aspect of a processor includes a cache memory, an issuing unit that issues, with respect to all element data as a processing object of a load instruction, a cache request to the cache memory for each of a plurality of groups which are divided to include element data, a comparing unit that compares addresses of the element data as the processing object of the load instruction, and determines whether element data in a same group are simultaneously accessible, and a control unit that accesses the cache memory according to the cache request registered in a load queue registering one or more cache requests issued from the issuing unit. The control unit processes by one access whole element data determined to be simultaneously accessible by the comparing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a configuration example of a processor in a present embodiment;

FIG. 2 is a diagram illustrating a configuration example of entries of a load queue illustrated in FIG. 1;

FIG. 3 is a flowchart illustrating a process example in the processor illustrated in FIG. 1;

FIG. 5 is a diagram illustrating a configuration example of entries of a load queue illustrated in FIG. 4;

FIG. 6 is a flowchart illustrating a process example in the processor illustrated in FIG. 4;

FIG. 7 is a time chart illustrating an example of operation of the processor in this embodiment;

FIG. 8A and FIG. 8B are time charts illustrating examples of operation of the processor;

FIG. 9 and FIG. 10 are time charts illustrating examples of operation of the processor in this embodiment;

FIG. 11 is a diagram illustrating an example of entry registration information of a store queue in the example illustrated in FIG. 4;

FIG. 13 is a time chart illustrating an example of operation of the processor in this embodiment;

FIG. 14, FIG. 15, and FIG. 16 are diagrams illustrating circuit examples of a gather-load address generating unit, an address retaining latch, and an address comparing circuit; and FIG. 17A and FIG. 17B are diagrams illustrating examples of grouping of processes of the GATHER-LOAD instruction in two element data.

DESCRIPTION OF EMBODIMENTS

Figure 4:
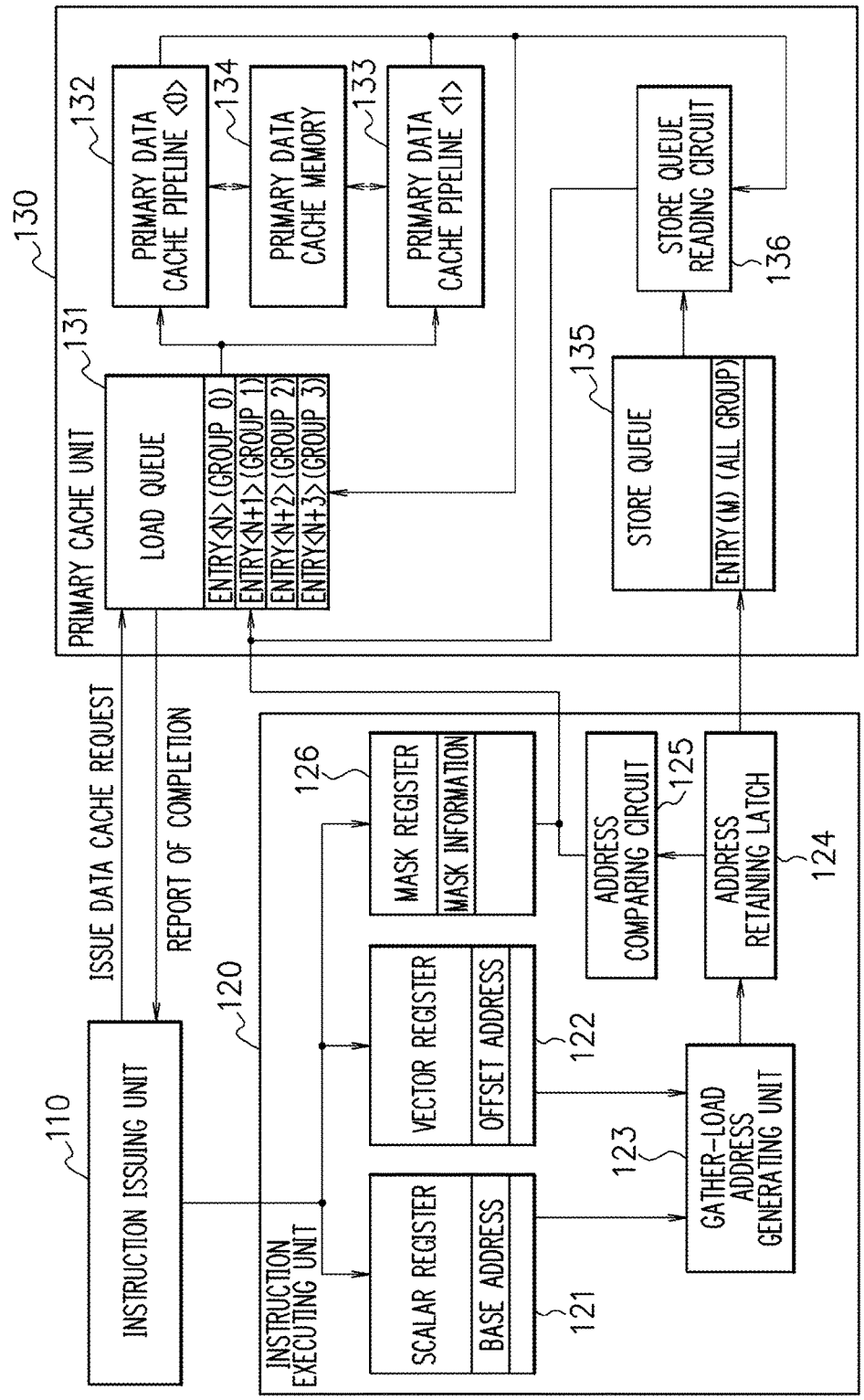
FIG. 4 is a diagram illustrating another configuration example of the processor in this embodiment.

Embodiments will be explained based on drawings.

In an embodiment, as will be explained below, a gather-load instruction executed by a processor is not processed in parallel by disassembling per element data, but is processed by disassembling a plurality of element data into groups. For each group, issuance of primary data cache request, acquisition of load queue, and pipeline execution are carried out, and processes of different groups are processed in parallel.

In this embodiment, in a case where a plurality of element data in the same group are all simultaneously cache-accessible, load processes of the plurality of element data are performed at once, so as to improve throughput performance of the entire gather-load instruction. In a case where mask information indicating whether it is necessary to load respective element data is defined, when it is unnecessary to load all the element data of the same group, a cache pipeline as a processing unit is not consumed for this group, and the process is completed immediately. In a case where the plurality of element data of the same group cannot be simultaneously cache-accessed, every element data which cannot be simultaneously cache-accessed is re-executed from a load queue, so as to perform a cache access.

FIG. 17A and FIG. 17B illustrate examples of grouping of processes of the gather-load instruction in two element data. FIG. 17A illustrates an example of grouping of the gather-load instruction of 8 bytes×8 SIMD in two-element units, and each area 1710-1, 1710-2, 1710-3, 1710-4, 1710-5 indicates the range that can be read by one cache access. When eight element data, element data 00 to element data 07, stored in non-continuous areas in a memory are loaded to a vector register 1711, for example, they are divided into groups so that the element data 00 and the element data 01 are in group 0, the element data 02 and the element data 03 are in group 1, the element data 04 and the element data 05 are in group 2, and the element data 06 and the element data 07 are in group 3.

The element data 02 and the element data 03 of group 1 are not in the range readable by one cache access and hence needs two cache accesses. On the other hand, the element data 00 and the element data 01 of the group 0, the element data 04 and the element data 05 of the group 2, and the element data 06 and the element data 07 of the group 3 are in the range readable by one cache access, and hence can be processed by one cache access respectively. Therefore, processes related to the element data 00 to the element data 07 can be completed by executing five times of cache pipelines in total. Compared to when every element data is processed (eight processes in total), the throughput related to the gather-load instruction can be improved in this embodiment.

FIG. 17B illustrates an example of grouping of the gather-load instruction of 4 bytes×16 SIMD in two-element units, and each area 1720-1, 1720-2, 1720-3, 1720-4, 1720-5 indicates the range that can be read by one cache access. When sixteen element data, element data 00 to element data 15, stored in non-continuous areas in the memory are loaded to the vector register 1721, for example, they are divided into groups so that the element data 00 and the element data 01 are in group 0, the element data 02 and the element data 03 are in group 1, the element data 04 and the element data 05 are in group 2, and the element data 06 and the element data 07 are in group 3, the element data 08 and the element data 09 are in group 4, the element data 10 and the element data 11 are in group 5, the element data 12 and the element data 13 are in group 6, and the element data 14 and the element data 15 are in group 7.

The element data 08 and the element data 09 of group 4 are not in the range readable by one cache access and hence needs two cache accesses. On the other hand, the element data 00 and the element data 01 of the group 0, the element data 02 and the element data 03 of the group 1, the element data 04 and the element data 05 of the group 2, the element data 06 and the element data 07 of the group 3, the element data 10 and the element data 11 of the group 5, the element data 12 and the element data 13 of the group 6, and the element data 14 and the element data 15 of the group 7 are in the range readable by one cache access, and hence can be processed by one cache access respectively. Therefore, processes related to the element data 00 to the element data 15 can be completed by executing nine times of cache pipelines in total. Compared to when every element data is processed (sixteen processes in total), the throughput related to the gather-load instruction can be improved in this embodiment.

FIG. 1 is a diagram illustrating a configuration example of the processor in the embodiment. FIG. 1 illustrates a configuration related to processing of the gather-load instruction among configurations which the processor in this embodiment includes. The processor in this embodiment includes an instruction issuing unit 110, an instruction executing unit 120, and a primary cache unit 130.

When the gather-load instruction is executed, a gather-load address calculation instruction is issued from the instruction issuing unit 110 to the instruction executing unit 120. The gather-load instruction indicates a base address and indicates an offset address for every element data. In the example illustrated in FIG. 1, a gather-load address generating unit 123 calculates the addresses of all the element data based on a base address supplied from a scalar register 121 and an offset address of every element data supplied from a vector register 122. The calculated addresses of all the element data are retained in an address retaining latch 124, and supplied to an address comparing circuit 125.

The address comparing circuit 125 determines whether element data contained in the same group are simultaneously cache-accessible, based on the supplied addresses of respective element data. In the same timing as issuance of a primary data cache request for each group from the instruction issuing unit 110, the address comparing circuit 125 outputs the addresses and address comparison results of all the element data in this group to the primary cache unit 130. In the instruction executing unit 120, mask information is read from a mask register 126 in parallel with address calculation and is outputted to the primary cache unit 130.

The primary cache unit 130 as a control unit registers in a load queue 131 the primary data cache request from the instruction issuing unit 110 and group information of the primary data cache request from the instruction executing unit 120. The group information of the primary data cache request includes the addresses, mask information, and an address comparison result related to respective element data. In the example illustrated in FIG. 1, an example of dividing the gather-load instruction of 8 bytes×8 SIMD into four groups of two element data to issue the primary data cache request is illustrated. As illustrated in FIG. 2, the request for each group is registered in four entries of entry <N>, entry <N+1>, entry <N+2>, entry <N+3> in the load queue 131.

FIG. 2 is a diagram illustrating a configuration example of the entries of the load queue 131 illustrated in FIG. 1. The state flag 201 is a flag indicating the state of an entry. In the state flag 201, for example, two bits "00" indicate that information of entry is invalid, "01" indicate a state that feeding into a cache pipeline is not allowed, "10" indicate that feeding into the cache pipeline is allowed, and "11" indicate that it is being processed in the cache pipeline. The state that feeding into the cache pipeline is not allowed is the state of, for example, making a request for the secondary cache memory due to a primary data cache miss. When data comes from the secondary cache memory, the state flag 201 changes to "10" to wait for being fed into the cache pipeline.

An element data size 202 is information indicating the size of each element data, and a group number 203 is information indicating a group ID grouping a plurality of element data. An address comparison result 204 is an address comparison result in the address comparing circuit 125, and a processing completion flag 205 is a flag indicating that processing related to each element data is completed. In this embodiment, in the processing completion flag 205, for example, two bits "00" indicate that processing related to both two element data is not completed, "10" indicate that processing related to only the head element data is completed, "01" indicate that processing related to only the subsequent element data is completed, and "11" indicate that processing related to both the two element data are completed.

A mask flag 206 is a flag indicating whether loading of each element data is necessary or not. In this embodiment, in the mask flag 206, for example, two bits "00" indicate that loading of both two element data is not necessary, "10" indicate that loading of only the head element data is necessary, "01" indicate that loading of only the subsequent element data is necessary, and "11" indicate that loading of both the two element data is necessary. A head element address 207 is an address for reading the head element data, and a subsequent element address 208 is an address for reading the subsequent element data.

The request for each group registered in the load queue 131 is fed into a primary data cache pipeline <0> 132 or a primary data cache pipeline <1> 133, and an access to a primary data cache memory 134 is executed, so as to simultaneously process all the element data which can be returned simultaneously. When the pipeline execution is finished, information in the corresponding entry in the load queue 131 is updated based on information of processing request (load queue number, result of primary data cache processing).

FIG. 3 is a flowchart illustrating a process example of the gather-load instruction in the processor illustrated in FIG. 1. At step S301, a request is issued for each group from the instruction issuing unit 110 to the primary cache unit 130. At step S302, the primary cache unit 130 determines whether element data to be processed (element data for which mask information is 1) exist among all the element data of the object group. When there is no element data to be processed (mask information is all 0), the process proceeds to step S303, and the primary cache unit 130 registers the request in a processing completed state in the load queue 131 without feeding a process into the cache pipeline.

On the other hand, when there is element data to be processed at step S302 (in other words, there is element data for which mask information is 1), the process proceeds to step S304, and the primary cache unit 130 feeds a cache access process into the cache pipeline. In the cache pipeline process, at step S305, the primary cache unit 130 determines whether element data to be processed (element data for which mask information is 1) include any element data that cannot be processed simultaneously. As a result of determination, when there is no element data which cannot be processed simultaneously (NO at step S305), at step S306 the primary cache unit 130 performs a cache access simultaneously to respond with data and registers the request in a processing completed state in the load queue 131.

As a result of determination at step S305, when there is element data which cannot be processed simultaneously (YES at step S305), at step S307 the primary cache unit 130 respond with data which can be returned by simultaneous cache accessing, and overwrite-updates the information of the cache request for the relevant group in the load queue 131. Thereafter, the process returns to step S304, the pipeline process of element data which could not have been processed is continued by re-feeding the cache access process into the cache pipeline, and is repeated until it is determined that data responses of all the element data are completed at step S305.

In this manner, when all the element data of the object group need not be executed a load process according to the mask information which is information of whether it is necessary to perform a load process corresponding to each element data, the request is registered in the load queue 131 by handling it as one for which processing is completed simultaneously as the issuance of the primary data cache request, thereby controlling that a cache access is not executed. Thus, when there is a large number of element data for which the execution is unnecessary, the primary data cache pipeline is not consumed wastefully and hence it is possible to feed another process, thereby improving efficiency of use of the pipeline.

And, when element data which cannot be read simultaneously exist in the same group, after the load queue 131 is updated according to a pipeline execution result, a cache access process of subsequent element data to be processed is further re-fed into the primary data cache pipeline, so as to process all the element data of the object group through a plurality of cache accesses. When processing of all the element data is completed, the completion is reported from the primary cache unit 130 to the instruction issuing unit 110. In this embodiment, by re-feeding from the load queue 131 and rotating in the primary cache unit 130, an overhead when a process related to the subsequent element data is re-executed can be reduced.

In order to re-feed the cache access process of the subsequent element data of each group, the address of the subsequent element data is necessary, and in the example illustrated in FIG. 1, the address of the subsequent element data is retained in an entry of the load queue 131 which is assigned to each group. As illustrated in FIG. 4, the addresses of the subsequent element data of all the groups are registered in a store queue 135, and it is possible to prevent an increase in the physical quantity of hardware of the load queue 131. In this case, while the head element data which needs to be processed is being processed in the primary data cache pipeline, the address of the next element data is chosen from the store queue 135, so as to overwrite-update the address to be registered in the load queue 131.

FIG. 4 is a diagram illustrating another configuration example of the processor in this embodiment. In FIG. 4, components having the same functions as those of the components illustrated in FIG. 1 are given the same reference numerals, and duplicating descriptions are omitted. It is different from the example illustrated in FIG. 1 in that the gather-load address generating unit 123 does not register the calculated access address of subsequent element data in each group of a gather-load instruction in the load queue 131 but registers the calculated access address of the subsequent element data in the store queue 135, which is conventionally used by a store instruction.

Among the addresses of all element data calculated in the gather-load address generating unit 123, the addresses of subsequent element data of all groups are forwarded via a store data bus and registered in the store queue 135. In the example illustrated in FIG. 4, the entire gather-load instruction is divided into four groups to issue the primary data cache request. However, only one entry of the store queue is allocated for the entire gather-load instruction.

When it is necessary to re-feed a plurality of cache line accesses from the load queue 131, a store queue reading circuit 136 reads necessary subsequent address information from the store queue 135 based on information (store queue number, subsequent element data information) of the primary data cache request which is pipeline-executed, and overwrite-update the load queue 131. Thereafter, a request for processing subsequent element data is re-fed into primary data cache pipelines 132, 133 from the load queue.

Comparing the example illustrated in FIG. 4 with the example illustrated in FIG. 1, the physical quantity of the circuit of the load queue 131 is reduced. Note that the store queue 135 and the bus for forwarding the address of subsequent element data and a store queue writing circuit are functions necessary for an ordinary store instruction, and thus are not components added for this embodiment. There may be cases where the store queue reading circuit 136 is added for this embodiment. Depending on the processor, when a store-forwarding (also called Store-Fetch-Bypass) function is mounted to read and transfer data from the store queue 135 between a preceding store process and a subsequent load process which has dependency to the preceding store process, the physical quantity of the circuit in this embodiment does not increase if the store queue reading circuit is shared.

FIG. 5 is a diagram illustrating a configuration example of entries of the load queue 131 illustrated in FIG. 4. In FIG. 5, components having the same functions as those of the components illustrated in FIG. 2 are given the same reference numerals, and duplicating descriptions are omitted. A processing element address 501 is an address for reading element data which is a processing object. In the processing element address 501, the address of head element data is registered when it is the primary data cache request from the instruction issuing unit 110, and when there is subsequent element data which cannot be processed simultaneously, it is overwrite-updated by the address of subsequent element data read from the store queue 135 simultaneously as completion of processing of the head element data. A subsequent element address 502 is information indicating from which position data is to be returned as the subsequent element data in a case where it can be processed simultaneously with the head element data. A store queue number 503 is information indicating from which entry of store queue 135 the address of the subsequent element data is to be read.

FIG. 6 is a flowchart illustrating a process example of the gather-load instruction in the processor illustrated in FIG. 4. At step S601, a request is issued for each group from the instruction issuing unit 110 to the primary cache unit 130. At step S602, the primary cache unit 130 determines whether element data to be processed (element data for which mask information is 1) exist among all the element data of the object group. When there is no element data to be processed (mask information is all 0), the process proceeds to step S603, and the primary cache unit 130 registers the request in a processing completed state in the load queue 131 without feeding a process into the cache pipeline.

On the other hand, when there is element data to be processed (there is element data for which mask information is 1), the process proceeds to step S604, and the primary cache unit 130 feeds a cache access process into the cache pipeline. In the cache pipeline process, at step S605, the primary cache unit 130 determines whether element data to be processed (element data for which mask information is 1) include any element data that cannot be processed simultaneously. As a result of determination, when there is no element data which cannot be processed simultaneously (NO at step S605), at step S606 the primary cache unit 130 performs a cache access simultaneously to respond with data and registers the request in a processing completed state in the load queue 131.

As a result of determination at step S605, when there is element data which cannot be processed simultaneously (YES at step S605), at step S607 the primary cache unit 130 respond with data which can be returned by simultaneous cache accessing, simultaneously reads from the store queue 135 the address of subsequent element data which could not have been processed simultaneously, and overwrite-updates the load queue 131. Thereafter, the process returns to step S604, the pipeline process of element data which could not have been processed is continued by re-feeding the cache access process into the cache pipeline, and is repeated until it is determined that data responses of all the element data are completed at step S605.

According to this embodiment, when a plurality of element data are divided into groups to issue a request and perform a pipeline process, the throughput performance improves in a case where a plurality of element data in the same group can be processed by one cache access. When dividing into groups in M number of element data units with respect to the gather-load instruction of N number of element data, data can be divided into (N÷M) number of groups, and issuance of the primary data cache request is performed (N÷M) times. For example, when all of the plurality of element data in the same group are simultaneously cache-accessible, use of the cache pipeline just needs to be (N÷M) times, and thus the performance improves M times as compared to using the pipeline N times for each element data.

Further, among the (N÷M) number of groups, a load processing related to a group in which there is no element data to be processes by an instruction of mask information is not fed into the cache pipeline. Thus, when only one group has element data to be processed for example, use of the pipeline just needs to be once, and hence the efficiency of the pipeline further improves.

Thus, in this embodiment, as performed in large-scale science and technology calculation, numerical simulation or the like, performing a sparse matrix operation with crude density for example, or an application accompanying an indirect reference, such as a database, the gather-load instruction can be executed with high throughput and low latency with respect to data stored in non-continuous areas in the memory, thereby achieving performance improvement of the processor.

In this embodiment, rather than comparing addresses among arbitrary element data to perform simultaneous processing, the simultaneous processing is performed by focusing on the simple way of dividing into groups, and thus mounting is possible in a manner that an increase in the physical quantity of hardware is prevented, such as an address comparing circuit. Moreover, the store queue is utilized for retaining the address of subsequent element data, and conflict in hardware resources and increase in physical quantity are prevented when gather-load instructions of different element data sizes and element data numbers are mixed.

Hereinafter, taking the processor illustrated in FIG. 4 as an example, a process example of the gather-load instruction in this embodiment will be explained. FIG. 7 illustrates an example of a time chart illustrating issuance of instructions and cache accesses in a case where the gather-load instruction is grouped in units of two-element data. The instruction issuing unit 110 pipeline-processes instruction fetches (IF1, IF2), instruction decoding (ID1, ID2), and resource assignments (DS1, DS2). When the instruction is issued, information from reading an operand register (OP1) is used to perform address calculations (AG1, AG2) of all element data in the instruction executing unit 120. In the timing according to the address calculations, the primary data cache request is issued (DR0) for each divided group from the instruction issuing unit 110 to the primary cache unit 130. And each of the primary data cache requests is fed into the cache pipeline to perform cache accesses (DC1, DC2). In this embodiment, two primary data cache pipelines exist and perform processing in parallel.

In the case of the gather-load instruction of 8 bytes×8 SIMD, first, a request for element data 00 and element data 01 and a request for element data 02 and element data 03 are simultaneously issued to the pipeline <0> and the pipeline <1>, respectively. Likewise, in the next cycle, a request for element data 04 and element data 05 and a request for element data 06 and element data 07 are simultaneously issued to the pipeline <0> and the pipeline <1>, respectively. A primary data cache request is issued four times for processing of 8 element data. If two-element data of all the groups can be simultaneously cache-accessed, the gather-load instruction will be completed by four times of pipeline executions.

In the case of the gather-load instruction of 4 bytes×16 SIMD, similarly, the gather-load instruction will be completed by eight times of primary data cache requests and pipeline executions for processing of 16 element data. Therefore, as compared to the case of processing element data one by one as illustrated in FIG. 8A and FIG. 8B, the number of times of using the pipelines is ½, and hence the throughput performance becomes twice as high. FIG. 8A and FIG. 8B illustrate examples of a time chart of instruction issuance and cache access in a case where the gather-load instruction is executed by processing element data one by one. In FIG. 8A, by the gather-load instruction of 8 bytes×8 SIMD, eight times of primary data cache requests and pipeline executions are performed. In FIG. 8B, by the gather-load instruction of 4 bytes×16 SIMD, sixteen times of primary data cache requests and pipeline executions are performed.

FIG. 9 illustrates an example of a time chart when groups other than group 0 (two element data at the head) need not be processed (mask information is 0) in a case where the gather-load instruction is grouped by two adjacent element data. Issuance (DR0) of a primary data cache request is the same as in the example illustrated in FIG. 7. However, only a process related to the group 0 (element data 00 and element data 01) is fed into the pipelines, and processes related to the remaining groups are registered in a processing completed state in the load queue without being subjected to a pipeline execution. In this case, the load of the pipelines decreases, and thus it becomes possible to perform processing of other instructions, cache miss operations, and the like.

FIG. 10 illustrates an example of a time chart when two element data of all the groups are on different cache lines in a case where the gather-load instruction is grouped by two adjacent element data. When an address calculation (AG1/AG2) of all the element data is performed, the address of the subsequent element data is forwarded (SET) to a store queue, and from the next cycle, the address of the subsequent element data is retained in a valid state in the store queue. The primary data cache request (DR0) is issued similarly to that in the example illustrated in FIG. 7. However, the two element data could not have been simultaneously cache accessed in the first pipeline execution (DC1, DC2), and thus the pipeline feeding and execution (second DC1, DC2) are performed again for processing the subsequent element data. The processing is completed by two times of pipeline executions per primary data cache request.

FIG. 11 illustrates an example of entry registration information of the store queue 135 in the example illustrated in FIG. 4. In a case where it is an ordinary store instruction, data of a store instruction is retained as entry 0 (ENT0). In the processor corresponding to 8 bytes×8 SIMD, each entry includes a data register of 8 bytes×8 SIMD =64 bytes. In the example illustrated in FIG. 11, in a case where the gather-load instruction of 8 bytes×8 SIMD is executed, addresses of all the element data are retained in one entry of the store queue 135 as described in entry 1 (ENT1).

In a case where the gather-load instruction of 4 bytes×16 SIMD is executed, the address of all odd-numbered element data are retained as addresses of subsequent element data as illustrated in entry 2 (ENT2). The address of head element data (even-numbered element data) of each group is registered in the load queue 131 when the primary data cache request is issued from the instruction issuing unit 110, and thus it is only the address of the subsequent element data that is to be retained in the store queue 135, so as to enable the operation. When the head element data (even-numbered element data) is processed, if the head element data (even-numbered element data) and the subsequent element data (odd-numbered element data) cannot be simultaneously accessed, the address of subsequent element data is chosen and read from the store queue 135.

In a case where the pipeline is used as in the time chart illustrated in FIG. 10, the address of the subsequent element data to be read by the primary data cache request being executed in the pipeline <0> is indicated by oblique lines sloping down to the right, and the address of the subsequent element data to be read by the primary data cache request being executed in the pipeline <1> is indicated by oblique lines sloping down to the left. In the case of 8 bytes×8 SIMD and the case of 4 bytes×16 SIMD, pipelines which read data of the same store queue 135 may be different and a conflict in reading may occur. Thus, in FIG. 11, an example of a configuration capable of reading any data from both the pipelines of pipeline <0> and pipeline <1> is illustrated.

First, an entry selecting circuit 1101 performs selecting in a selector SELA10 according to store queue number information STQ_ID0 of a request being executed in the pipeline <0>, and performs selecting in a selector SELA11 according to store queue number information STQ_ID1 of a request being executed in the pipeline <1>, thereby selecting two systems per pipeline. Thereafter, an element selection circuit 1102 performs selecting in a selector SELB10 according to information NUM0 of the subsequent element data of the request being executed in the pipeline <0>, and performs selecting in a selector SELB11 according to information NUM1 of the subsequent element data of the request being executed in the pipeline <1>, each of which thus selecting an address SADR0, SADR1 of one subsequent element data from the addresses of eight element data.

Figure 12:
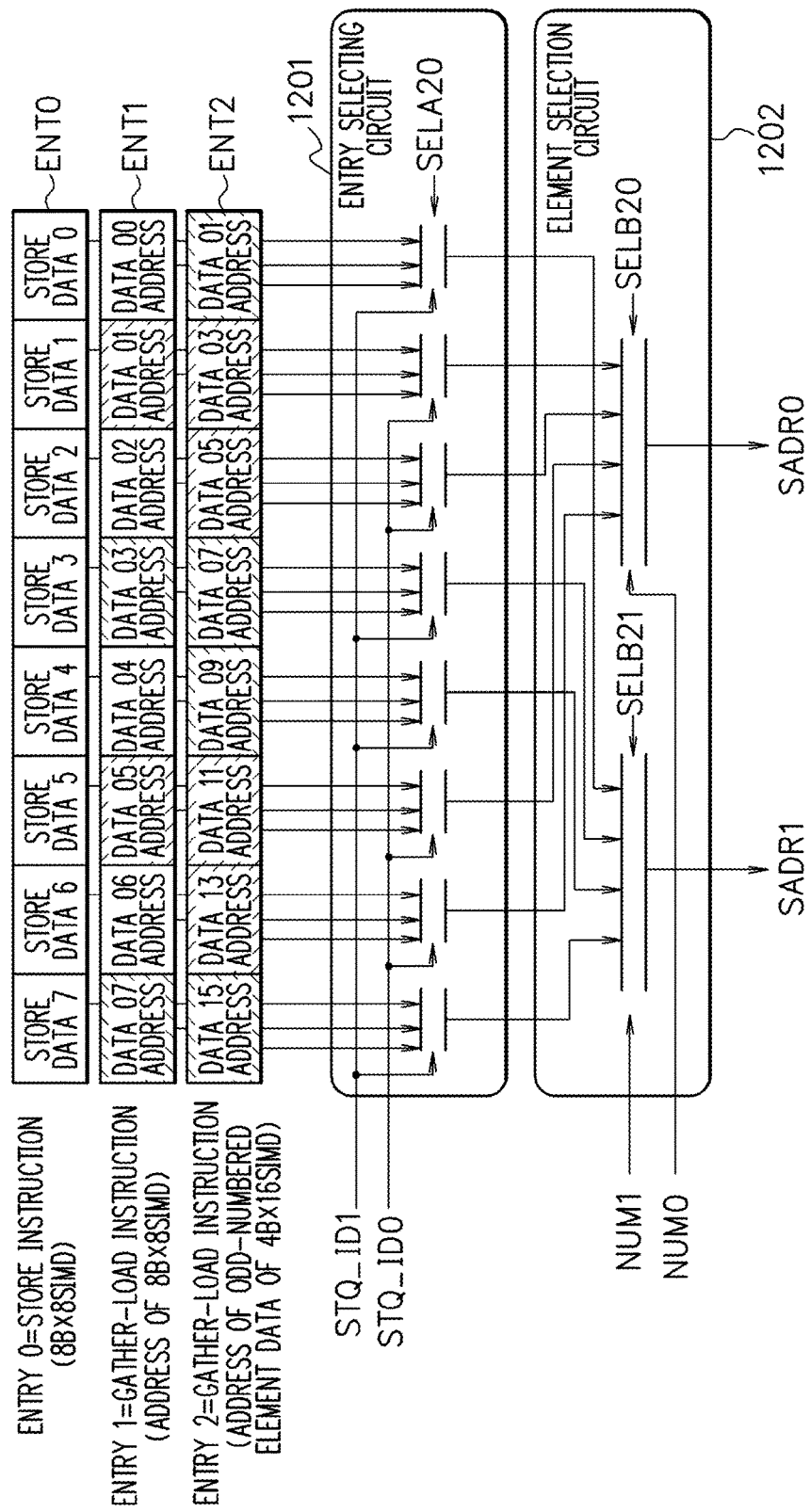
FIG. 12 is a diagram illustrating another example of entry registration information of the store queue in the example illustrated in FIG. 4.

FIG. 12 and FIG. 13 illustrate an example of entry registration information and a time chart for avoiding a conflict in reading of the same element data of the store queue 135 generated in the configurations illustrated in FIG. 10 and FIG. 11. In order to eliminate a conflict in reading of the same element data between two pipelines, a pipeline assignment in the case of 4 bytes×16 SIMD is changed. Specifically, as compared to the example illustrated in FIG. 11, the pipeline assignment of data of the entry 2 (ENT2) is changed in FIG. 12, and the four element data read by the pipeline <0> and four element data read by the pipeline <1> can be separated.

Accordingly, an entry selecting circuit 1201 needs only one system with the selector SELA20, and an element selecting circuit 1202 just needs to select the address of one subsequent element data from the addresses of four element data with the selector SELB20, SELB21. Thus, in the store queue 135, the number of read ports and selecting circuits can be decreased. An example of the time chart corresponding to FIG. 10 is illustrated in FIG. 13. It is different in that part of issuance pipelines of 4 bytes×16 SIMD is replaced. Specifically, the pipeline to which the group 0 and the group 1 of the 4 bytes×16 SIMD is assigned is changed. Similarly, the pipeline to which the group 4 and the group 5 are assigned is also changed.

Figure 14:
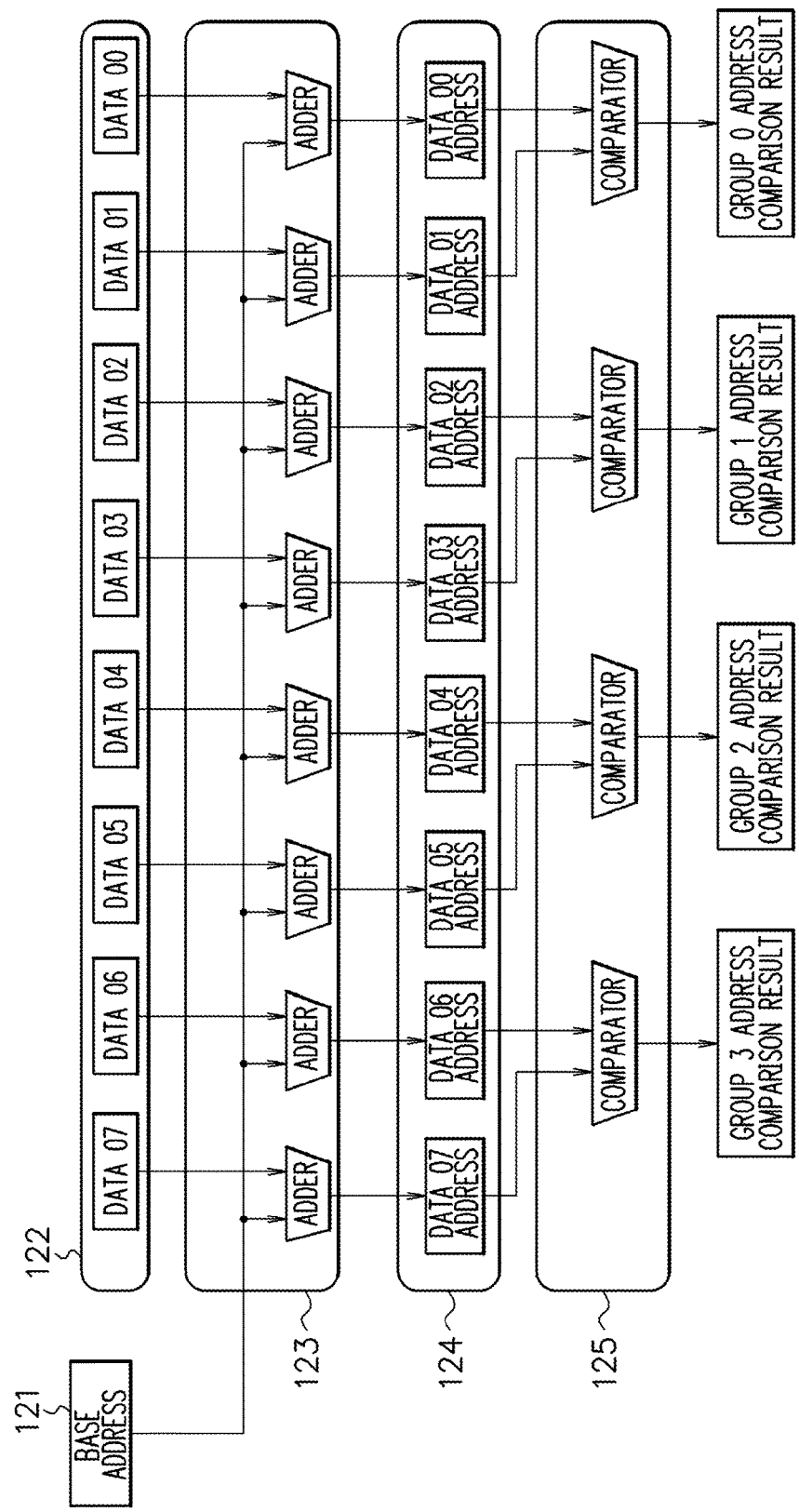

FIG. 14 and FIG. 15 illustrate circuit examples of the gather-load address generating unit 123, the address retaining latch 124, and the address comparing circuit 125 in a case where dividing into groups in two-element data units is performed. FIG. 14 illustrates a circuit example in a case where the gather-load instruction of 8 bytes×8 SIMD is executed. FIG. 15 illustrates a circuit example in a case where the gather-load instruction of 4 bytes×16 SIMD is executed.

In the example of 8 bytes×8 SIMD illustrated in FIG. 14, with inputs of a base address from the scalar register 121 and offset addresses of respective element data from the vector register 122, additions of eight element data are performed in adders of the address generating unit 123, so as to generate addresses. Then, after results are retained in the address retaining latch 124, the addresses of two adjacent element data assigned to the same group are compared in each of comparators of the address comparing circuit 125, so as to determine whether they can be simultaneously cache-accessed.

Therefore, the adders for address generation and address retaining latches by the number of element data, and comparators for address comparison by an element data number÷2 are needed. In the processor corresponding to 8 SIMD, adders are mounted in instruction executing units of 8 SIMD. A mounting is conceivable such that normal adders are used in a shared manner for address calculation, so as to lower hardware costs. In the example illustrated in FIG. 15, in order to correspond to 4 bytes×16 SIMD, necessary adders for address generation, address retaining latches, and comparators for address comparison are twice as many as those in the example illustrated in FIG. 14, and necessary data buses between the circuits and the latches are twice as many likewise.

FIG. 16 illustrates a configuration example of lowering hardware costs by performing address calculation in plural cycles in a case where it is a gather-load instruction having a small size of element data and a large number of element data. Besides, FIG. 14 and FIG. 15 illustrate a circuit example for corresponding only to the size of each element data. FIG. 16 illustrates a circuit example achieving both 8-byte element data and 4-byte element data.

In the example illustrated in FIG. 16, processing is performed by one cycle in a case where it is 8 byte×8 SIMD, and processing is performed by two cycles in a case where it is 4 byte×16 SIMD. In a case where it is 4 byte×16 SIMD, in order to calculate the address of head element data for the first cycle, and to calculate the address of the subsequent element data in the second cycle, in the address generating unit 123, selecting circuits which each select one of the offset addresses of the vector register 122 according to the size of the element data are added before the adders. In this example, the vector register 122 retains two offset addresses corresponding to respective element data, and selects one of the offset addresses corresponding to the size of the element data. Compared to the example illustrated in FIG. 15, the data buses and the adders after selecting the offset address are reduced to half, resulting in hardware costs equal to those of the example illustrated in FIG. 14.

In the example illustrated in FIG. 16, the address retaining latch 124 is needed as much amount as 16 element data. According to whether it is 8 bytes×8 SIMD or 4 bytes×16 SIMD, the address to be inputted to the address comparing circuit 125 is selected, resulting in a form including eight comparators of the address comparing circuit 125, in the form corresponding to both 8 bytes×8 SIMD and 4 bytes×16 SIMD. In this manner, the hardware cost related to address generation and address comparison can be lowered.

It should be noted that all of the above-described embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

According to one aspect of the embodiment, element data which are simultaneously accessible in a group constituted of a plurality of element data is processed by one access, and thereby a gather-load instruction can be executed with high throughput and low latency.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
   a cache memory;
   an issuing unit that issues, with respect to all element data as a processing object of a load instruction, a cache request to the cache memory for each of a plurality of groups which are divided to include element data by grouping in two or more element data;
   a vector register that retains a plurality of offset addresses corresponding to respective element data, and outputs one of the plurality of offset addresses corresponding to size of the element data indicated the load instruction;
   an address generating unit that generates an address corresponding to respective element data as the processing object of the load instruction using an offset address corresponding to respective element data outputted from the vector register;
   a comparing unit that compares addresses of the element data as the processing object of the load instruction, and determines whether element data in a same group are simultaneously accessible; and
   a control unit that accesses the cache memory according to the cache request registered in a load queue registering one or more cache requests issued from the issuing unit, and processes by one access whole element data determined to be simultaneously accessible by the comparing unit,
   the control unit performs accesses according to the cache requests of different groups in parallel.

2. The processor according to claim 1, wherein the control unit, in a case where a certain group contain object element data determined to be not simultaneously accessible by the comparing unit, updates information of the cache request for the certain group registered in the load queue according to processed element data, and performs based on the updated information an access related to other element data determined to be not simultaneously accessible in the certain group containing the object element data.

3. The processor according to claim 1, further comprising a mask register that retains mask information indicating whether a load of each element data as the processing object of the load instruction is necessary,
   wherein the control unit performs an access related to element data for which it is indicated that a load is necessary based on the mask information.

4. The processor according to claim 3, wherein in a case where there is no element data for which it is indicated that a load is necessary based on the mask information in a certain group, with respect to the certain group, the control unit registers the cache request in a processing completed state in the load queue, and does not perform an access to the cache memory.

5. The processor according to claim 1, wherein the control unit includes a store queue registering one or more store data, and the control unit registers as a load object in the store queue the address of subsequent element data among element data in the same group, and reads, when a subsequent load is performed, the address from the store queue and updates information of the cache request for the same group to be registered in the load queue.

6. The processor according to claim 1, wherein the control unit includes a plurality of processing units performing an access to the cache memory, and the control unit switches according to size of the element data a correspondence between the processing unit that feeds and executes the cache request and the group.

7. A control method of a processor including a cache memory, the control method comprising:
   issuing, with respect to all element data as a processing object of a load instruction, a cache request to the cache memory for each of a plurality of groups which are divided to include element data by grouping in two or more element data, by an issuing unit of the processor;
   outputting one of a plurality of offset addresses corresponding to size of the element data indicated the load instruction, by a vector register of the processor, the vector register retaining the plurality of offset addresses corresponding to respective element data of the processor;
   generating an address corresponding to respective element data as the processing object of the load instruction using an offset address corresponding to respective element data outputted from the vector register, by an address generating unit of the processor;
   comparing addresses of the element data as the processing object of the load instruction, and determining whether element data in a same group are simultaneously accessible, by a comparing unit of the processor; and
   accessing the cache memory according to the cache request registered in a load queue registering one or more cache requests issued from the issuing unit, and processing by one access whole element data determined to be simultaneously accessible by the comparing unit, by a control unit of the processor, accesses according to the cache requests of different groups are performed in parallel.

* * * * *